US009264625B2

(12) United States Patent
Celia

(10) Patent No.: US 9,264,625 B2
(45) Date of Patent: Feb. 16, 2016

(54) IMAGE CAPTURING APPARATUS WITH MANAGEMENT AND CORRECTION OF INCLINATIONS

(75) Inventor: Saverio Celia, Rivalta di Turin (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 0 days.

(21) Appl. No.: 14/115,843

(22) PCT Filed: May 9, 2012

(86) PCT No.: PCT/IB2012/052314
§ 371 (c)(1),
(2), (4) Date: Nov. 5, 2013

(87) PCT Pub. No.: WO2012/153281
PCT Pub. Date: Nov. 15, 2012

(65) Prior Publication Data
US 2014/0085533 A1 Mar. 27, 2014

(30) Foreign Application Priority Data
May 10, 2011 (IT) ................................ TO2011A0410

(51) Int. Cl.
*H04N 5/232* (2006.01)
*G03B 5/00* (2006.01)
(Continued)

(52) U.S. Cl.
CPC .............. *H04N 5/23296* (2013.01); *G03B 5/00* (2013.01); *G03B 17/00* (2013.01); *H04N 5/2253* (2013.01); *H04N 5/23287* (2013.01)

(58) Field of Classification Search
CPC ............ H04N 5/23296; H04N 5/2253; H04N 5/23287; G03B 17/00; G03B 5/00
USPC ....................................................... 348/208.7
See application file for complete search history.

(56) References Cited

U.S. PATENT DOCUMENTS 6,477,329 B2 * 11/2002 Weng et al. .............. 348/333.06
2005/0206736 A1 * 9/2005 Ng et al. ................... 348/208.7
(Continued)

FOREIGN PATENT DOCUMENTS

JP 2002-064738 2/2002
JP 2002-344785 11/2002
(Continued)

OTHER PUBLICATIONS
International Search Report dated Sep. 6, 2012, issued in PCT Application No. PCT/IB2012/052314.
(Continued)

*Primary Examiner* — Jason Flohre
(74) *Attorney, Agent, or Firm* — Workman Nydegger

(57) ABSTRACT

An image capturing apparatus includes a body that can be freely inclined relative to a predetermined reference axis through the effect of a rotation about a certain axis of rotation, an optical sensor device capable of capturing luminous radiation incident thereon and of converting it so that it can be stored into a physical medium in the form of a captured image, wherein the optical sensor device is mechanically coupled to the body of the apparatus in a manner such that it can be made capable of controllably rotating about the axis of rotation, an inclination sensor adapted to detect the angular offset of the optical sensor device with respect to the predetermined reference axis, a motor adapted to rotate the optical sensor device about the axis of rotation when it is made capable of controllably rotating about the axis of rotation by the motor, a processor and controller associated with the inclination sensor and with the motor and adapted to change the inclination of the optical sensor device through the motor depending on the angular offset detected by the inclination sensor with respect to the predetermined reference axis.

17 Claims, 9 Drawing Sheets

(51) Int. Cl.
*G03B 17/00* (2006.01)
*H04N 5/225* (2006.01)

(56) References Cited

U.S. PATENT DOCUMENTS

| | | | |
|---|---|---|---|
| 2009/0021589 A1* | 1/2009 | Okada | 348/208.1 |
| 2009/0219402 A1 | 9/2009 | Schneider | |
| 2010/0158492 A1* | 6/2010 | Uenaka | 396/55 |
| 2011/0228102 A1* | 9/2011 | Hashi et al. | 348/187 |

FOREIGN PATENT DOCUMENTS

| | | |
|---|---|---|
| JP | 2005-151518 | 6/2005 |
| JP | 2005-217993 | 8/2005 |
| JP | 2006-229697 | 8/2006 |
| JP | 2006-314042 | 11/2006 |
| JP | 2007-163998 | 6/2007 |
| JP | 2007-306417 | 11/2007 |
| JP | 2010-170098 | 8/2010 |
| WO | 2007/147449 A1 | 12/2007 |

OTHER PUBLICATIONS

Written Opinion dated Sep. 6, 2012, issued in PCT Application No. PCT/IB2012/052314.

* cited by examiner

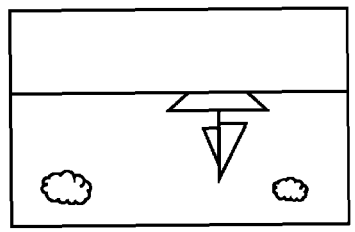
Fig. 3a
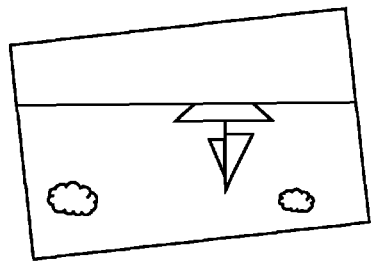
Fig. 3b1
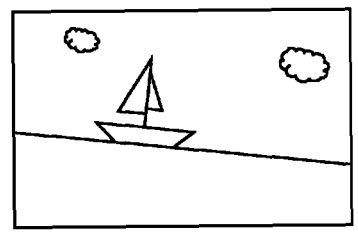
Fig. 3b2
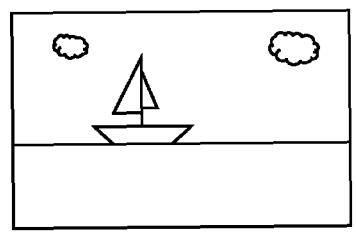
Fig. 3c

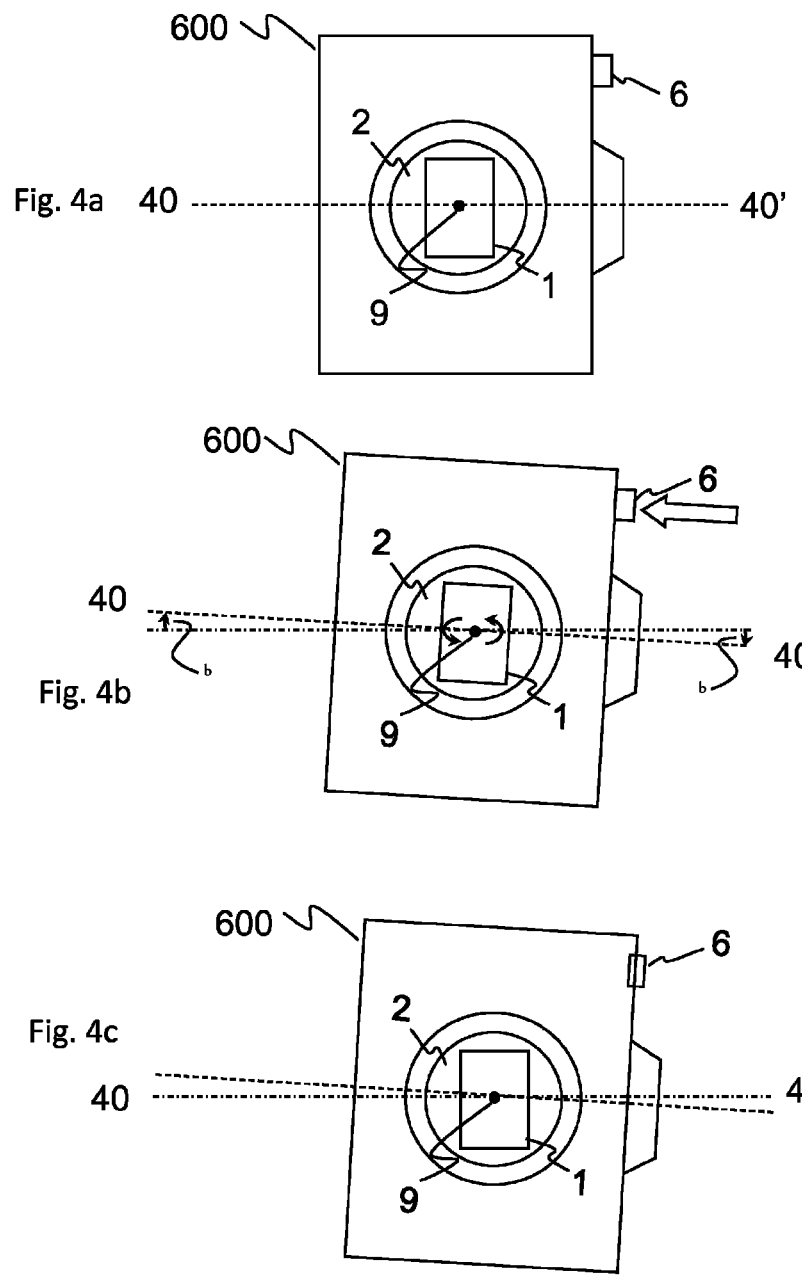

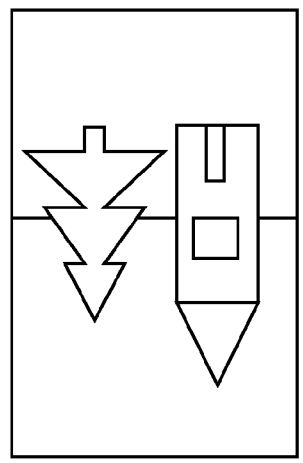
Fig. 5a
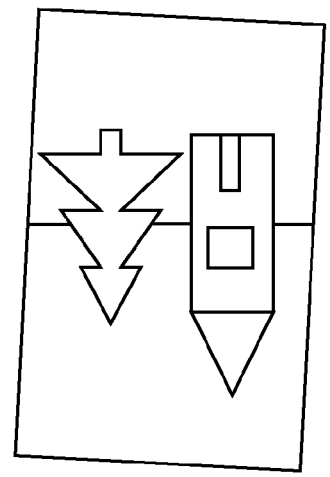
Fig. 5b1
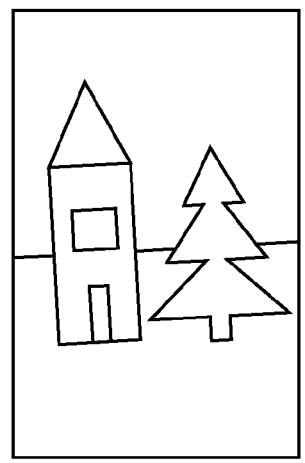
Fig. 5b2
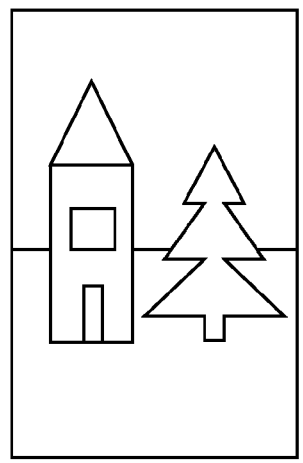
Fig. 5c

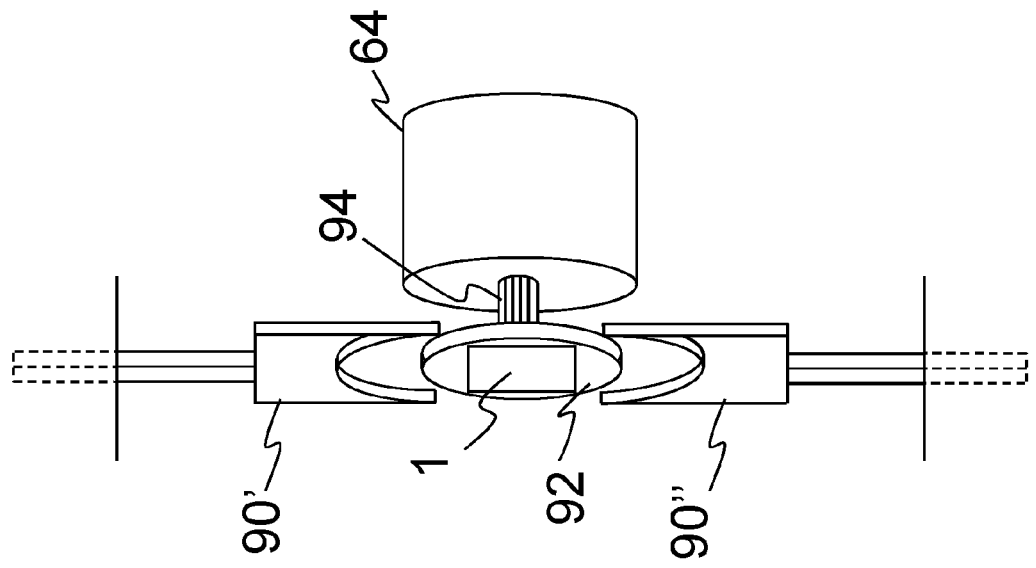
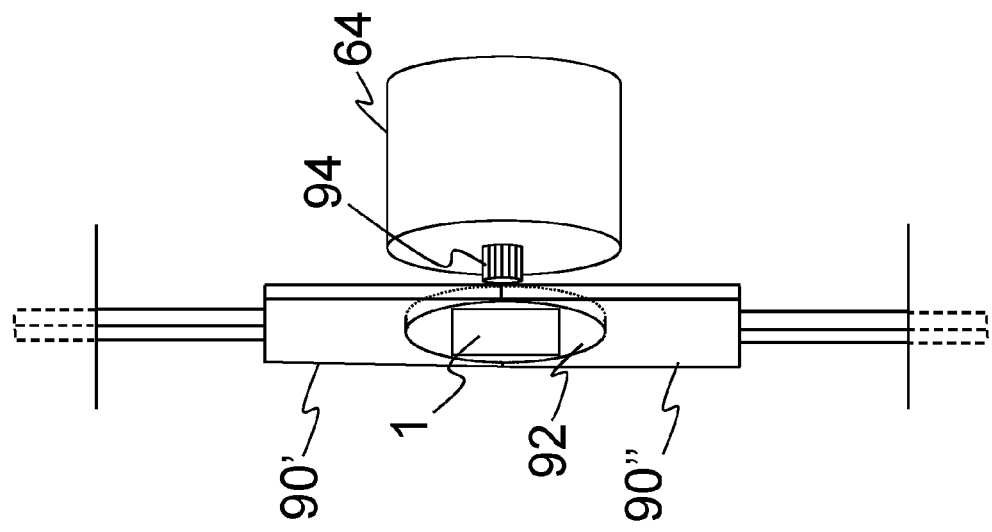

IMAGE CAPTURING APPARATUS WITH MANAGEMENT AND CORRECTION OF INCLINATIONS

TECHNICAL FIELD

The present invention relates to an image capturing apparatus. In particular, it relates to a photographic or cinematographic shooting apparatus, and more in general to any apparatus adapted to capture and store still or moving images.

Modern image capturing apparatuses, e.g. photo cameras and video cameras, can capture both still and moving images in a wide variety of environmental conditions, being capable of automatically adapting the framing, exposition length and focusing operating parameters; this brings many advantages to unskilled users as well, who can thus use the apparatus in all environments and operating conditions with relative ease.

In order to obtain high-quality and pleasant images, it is important that during reproduction the contours of the framed objects are positioned in the resulting photos or videos in accordance with that particular inclination with which viewers are used to seeing them or expect to see them. For example, in the case of an image comprising the earth horizon line, the surface of separation of a stretch of water from the sky, a window, a porch or a painting, it is normally preferable to obtain a photograph or a video that show these subjects with the particular inclination at which they are normally visible; therefore, it is preferable to obtain a photograph or a video representing the earth horizon as perfectly horizontal, i.e. with an inclination which is negligible or anyway hardly perceivable by the viewer compared to at least one substantially straight edge of the photograph or video, which generally have a rectangular shape with parallel opposite sides.

A viewer sees the horizon or any contour or profile of objects arranged horizontally or vertically in a scene always with the same inclination, regardless of the inclination of his/her head and, consequently, of his/her eyes observing that scene. The earth horizon will always be perceived as horizontal, independently of the position of the viewer's head. Conversely, if the photo camera or video camera is tilted with respect to the objects in the scene, the latter will be taken "askew", i.e. with the inclination that the photo camera or video camera had when capturing the scene; in this case, the framed objects will be shown inclined relative to the horizontal framing reference axis, which normally consists of an image confined within a substantially rectangular frame.

PRIOR ART

To avoid taking images or videos undesirably representing objects askew, various systems have been conceived which are more or less effective.

According to a first solution, the viewfinder and/or the display (e.g. an LCD) of the capturing apparatus is provided with one or more graphic markers (e.g. segments or rectangles) indicating to the user horizontal and/or vertical reference axes which, being superimposed on the framed scene, allow aligning the subject of interest with the image frame. This solution has the drawback that, when the light is too intense or too weak, the framed scene becomes poorly visible because the intense light darkens the LCD or the dark scene is not visible on the LCD; in these conditions the user can no longer align the objects to be captured with the graphic markers and hence with the frame edges. Moreover, especially in compact capturing apparatuses fitted with a small optical viewfinder, it becomes difficult for the user, in certain environmental situations, to be able to evaluate with sufficient accuracy the inclination of the objects being framed in the viewfinder. Also, no remedy is effective when images must be captured very quickly at a particular instant during an event of interest, since the user has no time to align the shooting apparatus in the desired direction.

A second possibility is to use photo retouching or video editing software programs which allow to straighten up the captured images a posteriori, by rotating them by an arbitrary angle either clockwise or counterclockwise and by cutting them in such a way that the scene will no longer appear to be tilted relative to at least one edge of the image. This solution requires the user to have in-depth knowledge of specific software programs, which is not the case of most users of photo cameras and video cameras, who are then obliged to turn to a specialized centre, thus spending money and time. In addition, the cutting that must be done after rotating the image for making it straight causes the loss of some peripheral areas of the image, the size of which depends on the extent of the undesired inclination affecting the image, resulting in possible undesired losses of portions of the captured scene which might contain important details.

For example, an image stabilization system for a photographic apparatus is known from US-2009/219402-A1, which includes rotation sensors for the three Cartesian axes. The angular movements imparted by the user with respect to the three axes are measured, and each movement is compensated for by an equal and contrary movement caused by stabilizer devices, which reduce artifacts, blurring and motion blur in the acquired image, which are due to such undesired movements imparted by the user when shooting. In short, said system is used in order to try to hold the sensor of the photographic apparatus as still as possible during its excitation, i.e. during the process of acquiring the image created by the luminous signals entering through the lens, by compensating for all angular micro-movements undesirably imparted by the user during said excitation. A stabilization system like the one described in this document neither faces nor solves the problem of compensating for the inclination of the shooting apparatus with respect to the horizontal axis or anyway to a predetermined axis, undesirably introduced by the user by positioning the apparatus incorrectly.

BRIEF DESCRIPTION OF THE INVENTION

It is the object of the present invention to provide an image capturing apparatus which does not suffer from the drawbacks of the prior art. In particular, it provides an apparatus which automatically avoids obtaining undesirably inclined photographs or videos, without requiring any intervention by the user before, during or after the capturing step.

Furthermore, the automatic alignment mechanism according to the present invention operates perfectly in any capturing condition, in particular in any scene lighting condition; the user needs not align the frame with the objects in the scene, and can therefore concentrate on the subjects that must be framed, with much greater practicality and ease of use, even for those particular shootings wherein proper alignment of the frame with the objects to be taken plays an important role as regards the quality and fruition of the captured image.

A further advantage offered by the invention described herein is that it allows the user to align any object being framed with the edges of the image in a comfortable and practical manner, at the very instant when capturing takes place, thereby eliminating the need for using later complex photo or video editing software applications in order to tilt the images in particular directions desired by the user.

The general idea at the basis of the present invention is to provide the still or moving image capturing apparatus with an inclination sensor capable of measuring the angular offset of the optical sensor device with respect to a predetermined straight axis, as well as with rotational motion actuator means associated with the optical sensor device for causing the latter to rotate with respect to the axis of rotation. Processing and control means are provided for rotating the optical sensor means through the rotational motion actuator means depending on the angular offset detected by the inclination sensor. Advantageously, the processing and control means change the angular position of the optical sensor device so as to substantially compensate for the angular offset with respect to the predetermined straight axis.

It is a particular object of the present invention to provide an image capturing apparatus with inclination correction and management as described in detail in the appended claims, which are intended as an integral part of the present description.

Further objects and advantages of the present invention will become more apparent from the following description of one embodiment thereof, which is supplied by way of non-limiting example.

BRIEF DESCRIPTION OF THE DRAWINGS

Said embodiments will be described with reference to the annexed drawings, wherein:

FIG. 3 shows some images that can be captured in the operating states shown in FIG. 2.

FIG. 4 schematically shows other operating states of an image capturing apparatus according to the present invention.

FIG. 5 shows some images that can be captured in the operating states shown in FIG. 4.

FIG. 9 shows one possible configuration of the mechanical coupling between the optical sensor device, the motor device and the machine body of the image capturing apparatus according to the invention.

Where appropriate, similar structures, components, materials and/or elements are designated by means of similar references.

DETAILED DESCRIPTION OF THE INVENTION

Figure 1:
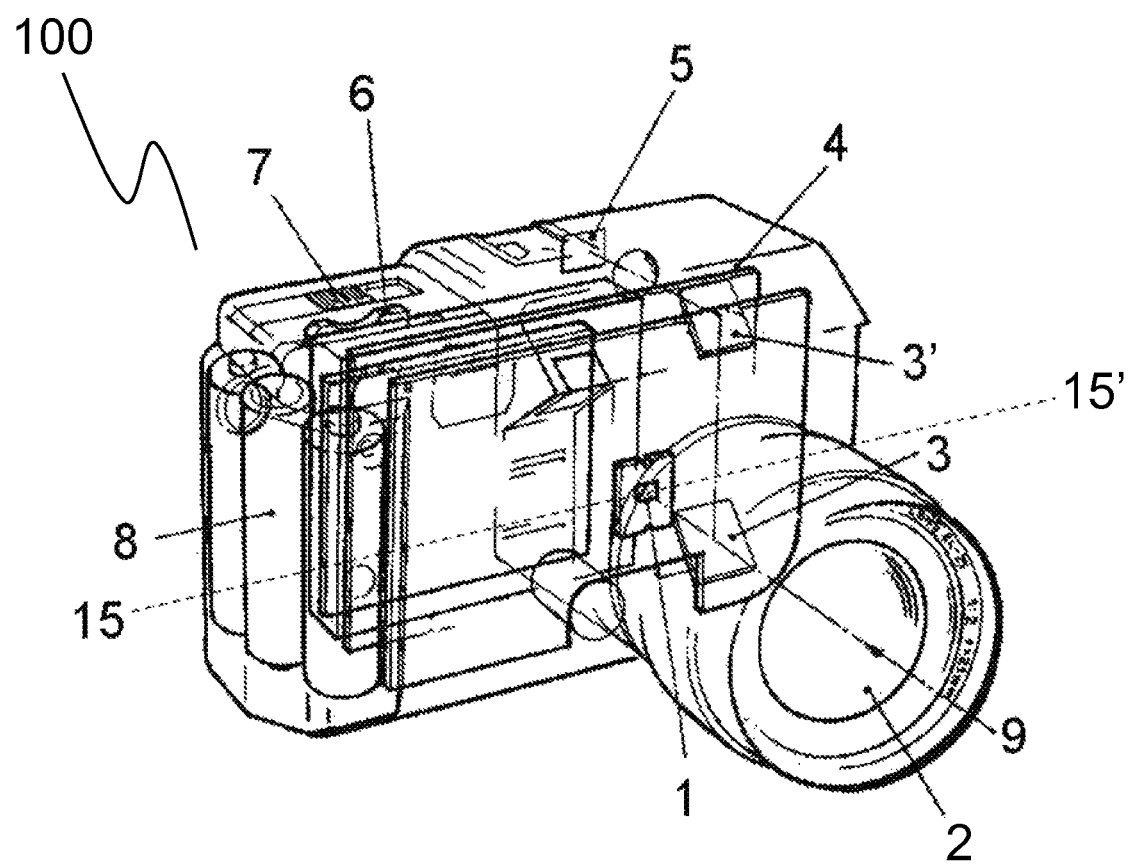
FIG. 1 is a relatively detailed diagram of a camera 100 according to the prior art.

FIG. 1 shows a diagram of the structure of a common Reflex camera, i.e. a camera equipped with an optical system that allows the user to see beforehand, with high fidelity, what the captured image will look like if a photo is taken. By means of a lens system 2, the incident luminous rays 9 are deviated through a system of mirrors 3, 3' and other optical devices towards a viewfinder, where the user can see a preview of the scene being framed, which can be captured by the apparatus by means of its optical sensor device 1, hereafter also referred to as capturing device. Generally the scene displayed in the viewfinder is straightened up, because the image arrives upside-down at the optical sensor device due to the physical dark-room effect produced by the lens system 2. Therefore, for example, the objects in the actual scene shown in FIGS. 3c and 5c arrive upside-down at the capturing device 1, as shown in FIGS. 3a and 5a, respectively. Usually, the circuitry of the electronic optical sensor provides for straightening up the image when such an optical sensor device is used.

Nevertheless, a system for straightening up the image in the viewfinder, an optical viewfinder substituting an LCD for displaying a preview with more or less fidelity of the scene being framed, and even any device for displaying the scene being framed are not at all necessary for implementing the present invention, since the latter is equally applicable to any image capturing apparatus, whether the images are captured individually or as parts of a video sequence.

The camera 100 is normally fitted with a power source 8 consisting, for example, of a set of batteries, a printed circuit board 4 comprising the electronic control and processing circuits necessary for the operation of the apparatus, as well as a number of control elements useful for controlling the operation of the apparatus. Typically a storage device is also included, which may be implemented in different forms (e.g. semiconductor memories, magnetic or optical discs) and with different capacities (from megabytes to gigabytes or more) for saving the captured images and/or videos in a non-volatile manner. In any case, the camera comprises a number of components which cannot be removed during the normal operation of the apparatus (e.g. keypads, switches, casing, electronic circuits, optical viewfinder, frame displays, printed circuit boards with integrated circuits and other electronic components, convergence and focus optical systems, diaphragm, etc.), and which are rigidly coupled together to form the body of the apparatus. These also include an element 6 for activating the image capturing process (push-button, switch, touch-screen surface, etc.), as well as a switch 7 with two or more positions used for changing the operating mode, e.g. for switching from viewing captured images to capturing new images, or from taking single images to shooting a sequence of video images, and so on.

Typically, an image is captured by a camera of the type shown in FIG. 1 as follows. When the user has decided that the scene currently being framed must be captured, he/she inputs a capture set-up command, e.g. by pressing the capture activation button 6. Depending on the currently active settings, the camera 100 will carry out one or more preliminary operations for preparing itself to capturing the scene, such as, for example, adjusting the exposition length, opening the diaphragm, focusing, setting the flash device, if necessary, and so on. In some cases the user may be notified that the capture setup step has ended by specific optical and/or audible warning means.

Subsequently, for instance if the user keeps pressing the activation button 6, the camera 100 will actually capture the framed image. In the case of a Reflex apparatus, the mirror 3 which was used for displaying the image coming in from the lens 2 is lifted, the shutter (not shown in FIG. 1), if present, is moved from the position where it covers the idle optical sensor device 1, and the incident luminous rays 9 are allowed to hit said sensor device for the exposition time considered to be appropriate for the diaphragm opening just set.

This description also applies to those non-Reflex cameras lacking the mirror system that allows the user to see in advance the image that will be captured if the photo is taken. Instead of the optical system that allows for the presence of the Reflex feature, there will be alternative systems allowing the user to see the image that will be captured on an LCD and possibly also on an optical viewfinder, although without the same high fidelity ensured by the Reflex system. In any case, however, at the end of the possible capture setup step activated by actuating the element 6, it will be ensured that the luminous rays 9 incident on the lens system 2 can reach the optical sensor device 1 and allow capturing the image.

A similar mechanism is employed when capturing sequences of images, i.e. a video or film, in which case the main difference is that the optical sensor device is allowed to be hit by the luminous rays as long as necessary, depending on the activation of the element 6 and/or through the activation of other control devices or other adjustment devices, e.g. the switching element 7, which will be set to a different position than necessary for activating the capture of single images.

Let us now describe an image capturing apparatus according to the present invention, with reference to FIGS. 2 to 6.

Figure 6:
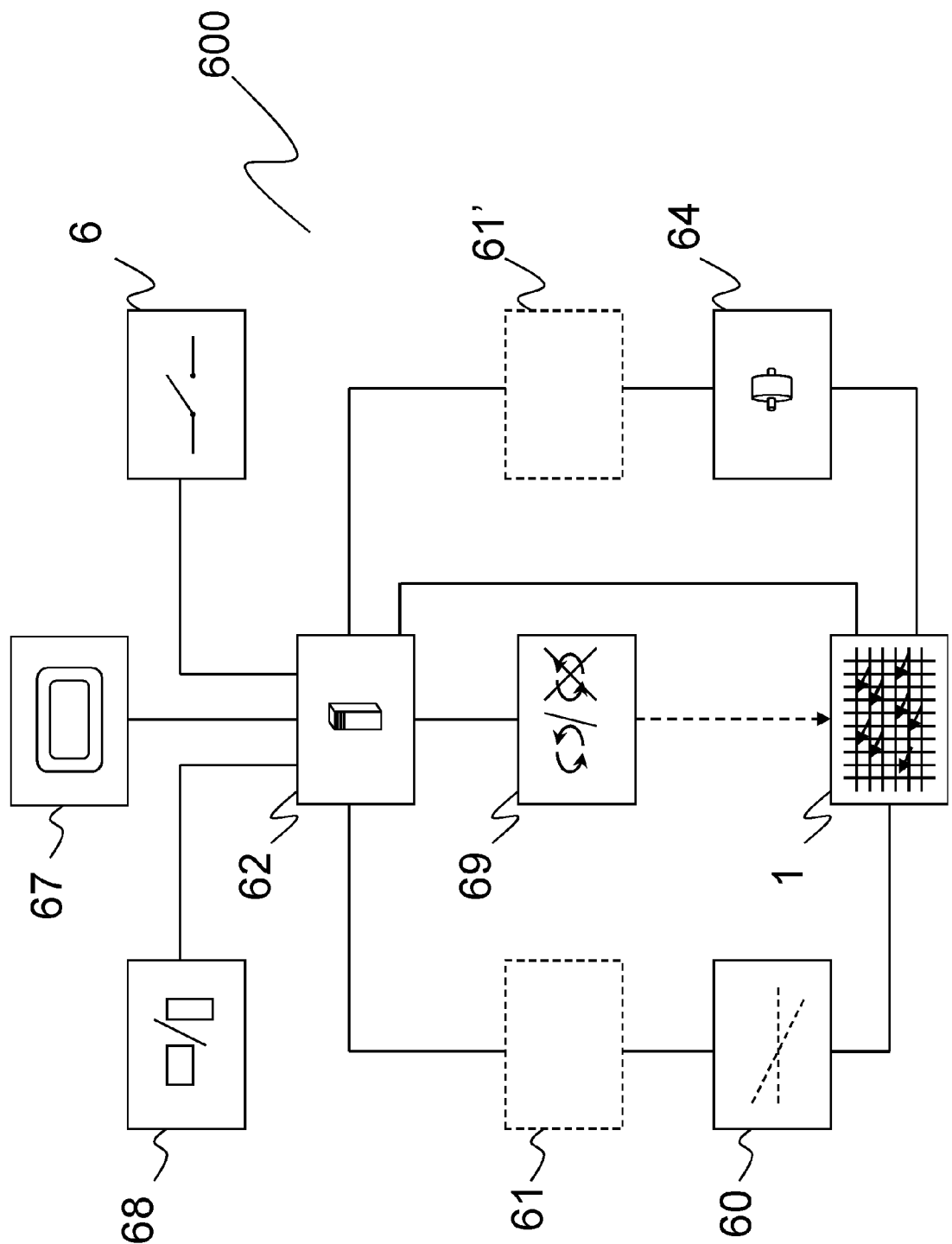
FIG. 6 is a block diagram of one embodiment of the image capturing apparatus according to the present invention.

The image capturing device 600 of FIG. 6 comprises an inclination sensor 60 capable of measuring the inclination of the optical sensor device 1 with respect to a predetermined reference axis. Inclinometer devices are available on the market which utilize the MEMS (Micro Electro-Mechanical Systems) technology and which are manufactured in the form of an integrated circuit having such characteristics (dimensions, accuracy, sensitivity, power voltages, and so on) that they can be used as inclination sensors in the present invention. The inclination sensor 60 may therefore consist of such an inclinometer, designed as an integrated and compact unit that can be housed inside the apparatus. The optical sensor device 1 is typically rectangular in shape, so that the inclination sensor may, for example, be mechanically coupled to one of the edges of the sensor device in order to be able to detect the inclination thereof with respect to the predetermined axis, which in this case will be parallel to said coupling side.

However, this is not strictly necessary if the optical sensor device is mounted in such a manner that, during detection, one side thereof is parallel to one surface of the body of the image capturing apparatus 600; after having established the side in question and, as a consequence, the axis that the surface is parallel to, the inclination sensor can be anchored to that surface to measure the desired inclination. In fact, detecting the inclination of this surface of the apparatus' body is equivalent to detecting the inclination of the capturing device 1.

For example, in the case of the image capturing apparatus 100 represented in FIG. 1, the optical sensor device 1 has a rectangular shape and a prevalently planar extension; it is rigidly surrounded by a body of the apparatus 100, also having a substantially rectangular section, for a considerable length along the axis of propagation of the luminous rays 9 (i.e. the optical axis of the lens system 2); at least a part of the edges of the body are at least partially parallel to those of the optical sensor device 1 placed at the centre of the body, so that in this case it will be sufficient to couple the inclination sensor 60 to a section of an edge parallel to one side of the capturing device 1 to detect the inclination thereof.

There are many possible ways, all equivalent, to mechanically couple the inclination sensor to the sensor device in order to measure the inclination undergone by the latter with respect to a predetermined reference axis, without affecting at all the result obtained for the purpose of the present invention.

The inclination sensor sends the measurement data to a processing and control unit 62, hereafter also referred to as governing unit, which controls the operation of the apparatus 600, possibly through a signal adaptation and conditioning unit 61, which appropriately adapts, whenever necessary, the measured inclination data to the characteristics of the unit 62, e.g. by carrying out scale change, analog-to-digital conversion, impedance adaptation, amplification, signal dynamics variation, current-to-voltage conversion operations and the like. The adaptation and conditioning unit 61 may even be absent or totally integrated into the inclination sensor 60 or into the unit 62, or its functions may be distributed in any manner between the sensor 60 and the unit 62.

FIG. 6 includes a display device 67, e.g. an LCD, which can display graphic elements superimposed on and/or next to or otherwise combined with the framed image that can be currently captured by the optical sensor device 1 if the capturing process is activated. The visualization of such graphic elements occurs under the control of the unit 62, based on user-defined settings and on the operating conditions of the capturing apparatus, which can be detected by devices interacting with the unit 62, such as, without being limited to, those shown in FIG. 6.

The capturing device 1 is also mechanically coupled to a motor device 64 capable of imparting a rotary motion thereto which can decrease or increase the inclination measured by the inclination sensor 60 through the effect of a rotation of the capturing device 1 due to an external cause, such as, for example, a rotary motion undesirably given by the user of the apparatus 600. This motor device may consist of, for example, a very small low-consumption, high-precision motor capable of rotating the optical sensor device 1 and any support it may be rigidly constrained to clockwise or counterclockwise by a predetermined angle, of course within predetermined angular accuracy levels. If necessary, multiple motor devices may be employed, one for rotations in one direction and another for rotations in the other direction and/or one for wider rotations and another, more accurate, for smaller rotations, without any impact whatsoever on the present invention.

The optical sensor device 1 and any support it is rigidly constrained to can rotate relative to an axis of rotation, which is fixed with respect to the capturing apparatus: for example, the axis of rotation may either coincide with or be parallel to the optical axis of the lens system 2, defined by the direction of the luminous rays 9. The optical sensor device is thus positioned substantially perpendicular to the axis of rotation.

The motor device 64 may consist of any device capable of imparting the desired angular rotation, calculated by the processing and control unit 62, to the capturing device 1. Typically, it may consist of a servomotor, i.e. a rotary motor capable of causing its own axis, and therefore any objects coupled thereto, to make a controlled clockwise and/or counterclockwise rotary movement by a predetermined angle, with appropriate width and resolution for the present invention. It comprises a direct or alternating current motor, a comparator and other units useful for controlling the operation of the motor and for causing it to impart the desired rotation, in terms of rotation direction, rotation speed and final position to be reached, to the motor shaft. These servomotors are fitted with means adapted to detect the current angular position of the axis of rotation and can verify that the desired position has actually been reached through a feedback mechanism that makes these devices very accurate, but also relatively complex and expensive.

Alternatively, so-called step motors may be used, i.e. discrete-movement motor devices capable of making, upon command, multiple angular micro-movements by a predetermined fixed value according to the digital control signals that they receive. This type of motor device offers the advantage of a simpler and more compact construction; in addition, it can output a torque that holds the motor shaft in the desired position as long as power is supplied thereto. Thanks to the latest advances in the manufacturing technology, this type of motor has now reached a sufficient level of accuracy and resolution for most applications. In general, this type of motor is not equipped with an internal mechanism for automatically verifying and correcting the angular position reached, so that an additional device is needed for making such verification and allowing any corrections that may be required because of errors in the position of the motor shaft. It should be noted that rotations are defined to less than integer multiples of a straight angle (360°); therefore, it is also possible to reach any angular position of the motor shaft through multiple clockwise or counterclockwise revolutions. Moreover, an angular rotation with a certain width (a), e.g. counterclockwise, or positive, will correspond to an angular rotation by (360-a) sexagesimal degrees in the opposite direction. De facto, these data are useful in the case wherein the motor device in use cannot, due to its own operational limitations, perform angular movements below a certain threshold, but is forced to travel for a wider angle, e.g. in order to be able to perform the rotation at a higher speed within a sufficiently short time.

In the simplest of cases, the motor device 64 may be coupled to the optical sensor device 1 by direct association with its own axis of rotation, if the motor device can perform the rotations which are necessary for implementing the present invention with sufficient speed, accuracy and resolution. As an alternative, the coupling may be effected in an indirect manner through toothed gears or other micro-mechanical devices which allow to increase or decrease, in predefined proportions, the angular widths of the rotary movements undergone by the capturing device 1 and corresponding to the rotations undergone by the shaft of the motor device 64. In this way, one can increase or decrease the angular resolution of the movements imparted to the capturing device 1 by the motor device 64. It is also possible to implement hybrid mechanical couplings, wherein the coupling may be either direct or indirect, or even feature variable trim, with different angular proportions that can be activated according to momentary requirements (width and direction of the angular rotation to be given, angular rotation speed to be reached, resolution and accuracy of the various rotations, etc.).

By way of example, FIG. 9 shows one possible way of mechanically coupling the optical sensor device 1 to the motor device 64 and to the machine body of the image capturing apparatus. FIG. 9a illustrates in a wholly schematic manner a disc-shaped bearing support 92 onto which the optical sensor device 1 is fastened (possibly with the associated electronic control and acquisition circuitry); the device may be integrally coupled to the machine body or to the shaft of the motor device 64. In particular, in FIG. 9a the bearing support 92 is rigidly constrained to the machine body by means of two jaws 90' and 90", which are anchored to the machine body through two pins jutting out of the machine body, which pins engage the bearing support 92 upon receiving a command from the governing unit, thus making the support integral with the machine body. The mechanical coupling may be further improved by using knurled, corrugated or indented contact surfaces, so as to increase the resulting coupling extension and cohesion in the locked position. On the contrary, the axis of rotation of the motor device 64 is decoupled from the bearing support 92 and hence from the capturing device 1. In this configuration, the capturing device 1 moves integrally with the capturing apparatus 100.

Whenever it is necessary, for the purposes of the present invention, to decouple the optical sensor device 1 from the image capturing apparatus in order to make it rotatable under the control of the motor device 64, the governing unit 62 (not shown in FIG. 9) commands the insertion of the motor shaft of the device 64 into a suitable cavity or recess at the centre of the bearing support 92, which cavity is not visible in FIG. 9 because it is located on the hidden circular surface. When the motor shaft is mechanically coupled to the support 92, the governing unit 62 commands the two jaws 90 to move away from the bearing support 92, so that the capturing device becomes rotatable under the control of the motor device 64. Of course, the inverse operation will be carried out when the optical sensor device 1 must be constrained to the image capturing device, taking care to couple the support 92 to the jaws 90 before decoupling the motor shaft, so as to avoid that the support 92 is left unanchored. As an alternative, there may be just one jaw capable of locking the support 92.

It is clear that the structure described herein is only exemplary and represents just one of the innumerable ways in which the bearing support and the optical sensor device 1 may be constrained to each other as needed by the present invention. For example, in a possible variant there may be two jaws 90, each consisting of two arms opening and closing upon command, just like pliers arms, instead of moving linearly under the action of the pins shown in FIG. 9. It should be noted that FIG. 9, for simplicity, does not show all the other items required by the system to operate correctly (e.g. position sensors for the mechanical actuators, power, signalling and control connection cables, and the like).

The processing and control unit 62 sends to the motor device 64 rotation commands that specify the absolute angular value and the direction of rotation, possibly through an additional signal adaptation and conditioning unit 61' which executes, if necessary, operations similar to those carried out by the unit 61, but this time applied to control signals sent by the governing unit 62 to the motor device 64 and to similar control and feedback signals issued by the latter device towards the unit 62. In this case as well, the functions carried out by the unit 61' may be partially or totally distributed between the processing and control unit 62 and the motor device 64. Alternatively, the unit 62 calculates the control signals required for rotating the motor device 64 based on the type of the latter (powered by direct or alternating current, step motor or servo motor, etc.) and sends them to said device, e.g. through the signal adaptation and conditioning unit 61, which may partially or totally generate the necessary control signals by starting from the value of the desired angular position obtained from the unit 62.

The processing and control unit 62 can receive control signals coming from an image capture activation element 6, the activation of which indicates to the unit 62 the necessity of capturing images in single image mode or as a sequence of images making up a video stream.

This element 6 may consist of, for example, a release push-button, the actuation of which is detected by the unit 62, which in such a case will govern the execution of the operations necessary for capturing the images in the selected mode. The unit 62 generally consists of a microprocessor that executes a special microprogram composed of instructions which allow governing the operation of the apparatus, with the aid of a memory for storing the user settings and the microprogram itself and a number of components of the apparatus which are necessary for it to operate correctly, including those shown in FIG. 6.

The following will describe the operation of the image capturing apparatus 600 according to the present invention.

FIG. 2 schematically illustrates a first mode of operation of an image capturing apparatus 600 according to the invention. It is equipped with an activation element 6 which, when actuated, allows the luminous rays 9 to hit an optical sensor device 1 through a lens system 2. It should noted that, in order to better illustrate the operation of the apparatus 600, the dimensions of the optical sensor device are purposely exaggerated in FIGS. 2 and 4 compared to the actual ones.

Figure 2A:
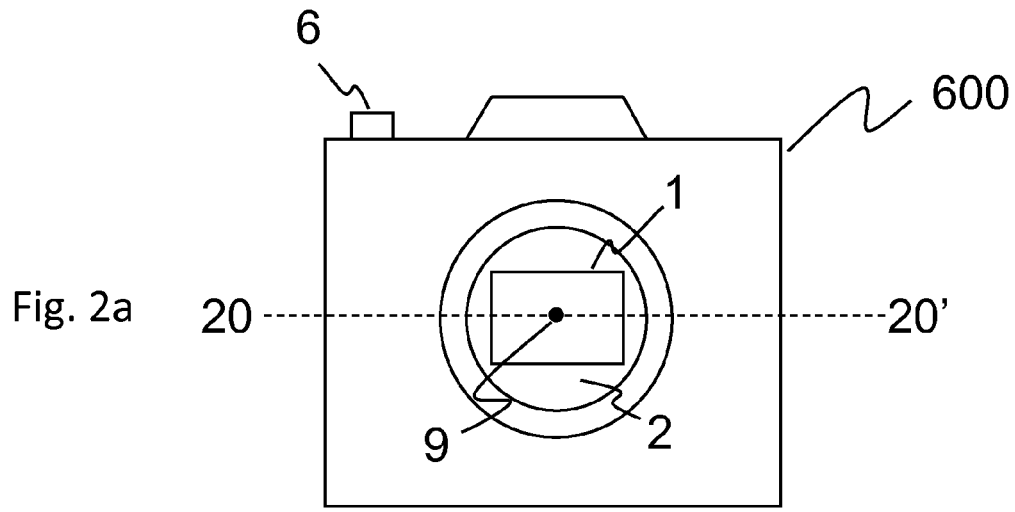
FIG. 2 is a schematic representation of various operating states of an image capturing apparatus according to the present invention.

In the idle condition, i.e. when the apparatus is off, in stand-by or anyway it is not performing a capture operation (FIG. 2a), the optical sensor device 1 is rigidly constrained to the body of the capturing apparatus 600. Typically, a certain portion of at least one surface of the outer casing of the apparatus is parallel to one edge of the optical sensor device 1. See for example the camera 100 of FIG. 1, wherein the horizontal axis 15-15' of the optical sensor device 1, which is rectangular in shape, is parallel to large portions of the top and bottom surfaces of the casing, which also has a substantially rectangular cross-section in those section planes parallel to the one containing the optical sensor device 1, which is prevalently planar. This spatial configuration allows the user to have an immediate and clear perception of the alignment of the capturing device 1 prior to starting a capture process. The same may happen in the image capturing apparatus 600 according to the present invention. Furthermore, the device 1 lies in a plane perpendicular to the incident luminous rays 9, and its centre of gravity is at the centre of the lens system 2. In this operating state, the sensor device 1 is generally rigidly constrained to the capturing apparatus, and cannot therefore make any movements independent thereof, as shown in FIG. 2a.

Figure 2B:
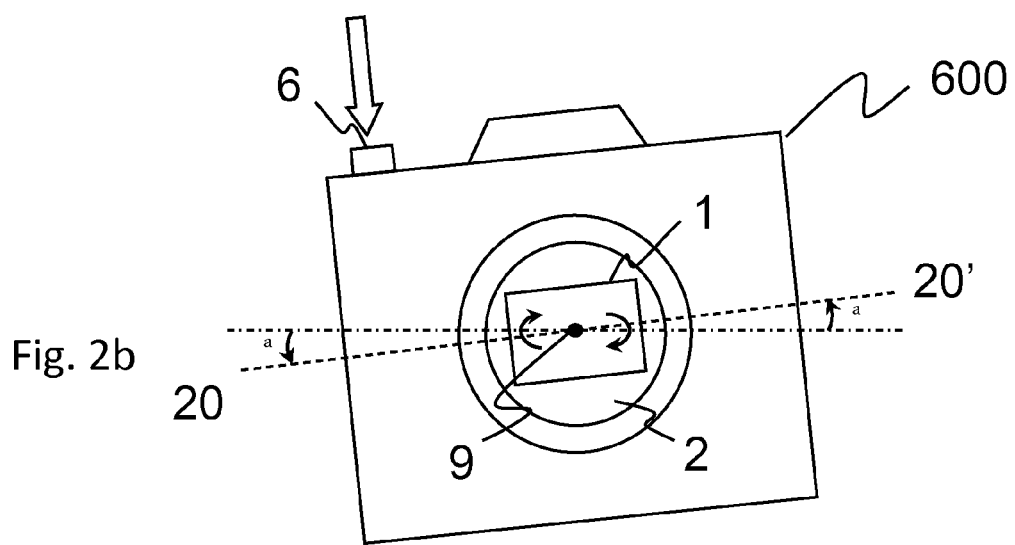

Let us now assume that the user of the apparatus actuates the activation element 6 in the situation shown in FIG. 2b, wherein the predetermined horizontal reference axis forms a non-null angle with the direction of the horizontal axis of the optical sensor device 20-20'. First it will be assumed that the predetermined reference axis corresponds to the axis perpendicular to the vertical where the user is located, in that it is assumed that the user wants to obtain a captured image aligned with its own edges, which is the commonest case. Let us now suppose that the scene aimed at by the apparatus 600 is a length of ocean with a boat sailing in front of a background of almost clear sky; the user will usually want the captured image to appear like the one of FIG. 3c, where the objects are not inclined with respect to the edges of the photograph or of the image file, unlike FIG. 3b2.

The image capturing apparatus 600 according to the present invention allows achieving this result automatically without requiring any user intervention. The processing and control unit 62 detects that the element 6 has been actuated and governs the execution of the programmed operations for preparing the apparatus for capturing the images in the modes currently active (adjustments of diaphragm opening, exposition time, focus, stabilization system, etc.). During the setup step, the processing and control unit 62 also acquires, from the inclination sensor 60, the value of the inclination, in terms of angular offset, undergone by the optical sensor device 1, corresponding to the inclination undergone by the axis 20-20' with respect to the predetermined reference axis; in this case it will be the inclination of the axis 20-20' with respect to the predetermined reference axis, represented by the horizontal axis. Inclination may be expressed, for example, as the value of the smallest convex angle opposite to the vertex crossed by the axis 20-20' which is required in order to move it from the direction coinciding with the horizontal reference axis to the direction taken in the situation shown in FIG. 2b, due to the rotation undergone by the optical sensor device 1 along the axis of rotation defined by the direction of the luminous rays 9. It is therefore a signed angle, since the direction of rotation must be taken into account. The convention is followed herein according to which positive angles are those angles which are travelled counterclockwise when viewed from above the plane containing them. In the case shown in FIG. 2b, the angle a travelled by the horizontal axis of symmetry 20-20' of the optical sensor device 1 is positive. Once it comes to know both the absolute value and the sign of the inclination undergone by the sensor, the processing and control unit 62 verifies whether it matches the predetermined one desired by the user or differs from it by negligible or non-measurable quantities; if not, the unit 62 will carry out a compensation in order to substantially cancel that offset and incline the captured image as desired by the user prior to actually capturing the framed image.

Because of the inclination that would be undergone by the sensor device with respect to the horizontal axis if the framed image 3c were captured immediately, on the sensor there would be the captured image shown in FIG. 3b1, wherein the image is supposed to be turned upside-down due to optical phenomena related to the system of lenses 2 arranged along the path of the luminous rays 9 entering the apparatus 600. FIG. 3b2 shows the image of FIG. 3b1 rotated by 180° and with its edges straightened up, i.e. made parallel to the page edges, so as to clearly show the final result of a photograph obtained in such a situation. It should be noted that the scene will thus acquire an unnatural and unaesthetic effect because of the inclination of the framed objects, which should therefore be avoided in most practical cases. As aforesaid, in FIG. 2b it is assumed that the user wants to obtain a captured image with null inclination with respect to the horizontal axis, i.e. the axis perpendicular to the vertical defined, on the earth surface, by the direction that joins the centre of gravity of the optical sensor device 1 to the centre of the earth, which approximately coincides with the direction of the force of gravity.

At this point, the unit 62 directly or indirectly causes the following operations to be carried out. First of all, it provides for making the sensor device 1 rotatable about the axis defined by the luminous rays 9, e.g. by sending a suitable control signal to a micro-mechanic actuator device 69 acting upon the rigid or loose mechanical coupling with the body of the capturing apparatus 600. As an alternative, the device 69 may be absent, and the function of making the optical sensor device 1 fixed or rotatable relative to the body may be carried out by the same motor device 64 used for keeping the device 1 rigidly constrained to the body of the apparatus 600 in a particular operating state, which can be controlled by the processing and control unit 62. In this latter case, the unit 62 causes the motor device 64 to exit this first particular operating state, inducing it to rotate the optical sensor device 1 by an angle having the same absolute value and the opposite sign, so as to cancel the angular offset present in the situation of FIG. 2b, wherein two curved arrows indicate the direction of rotation imposed on the optical sensor device 1 by the motor device 64.

Figure 2C:
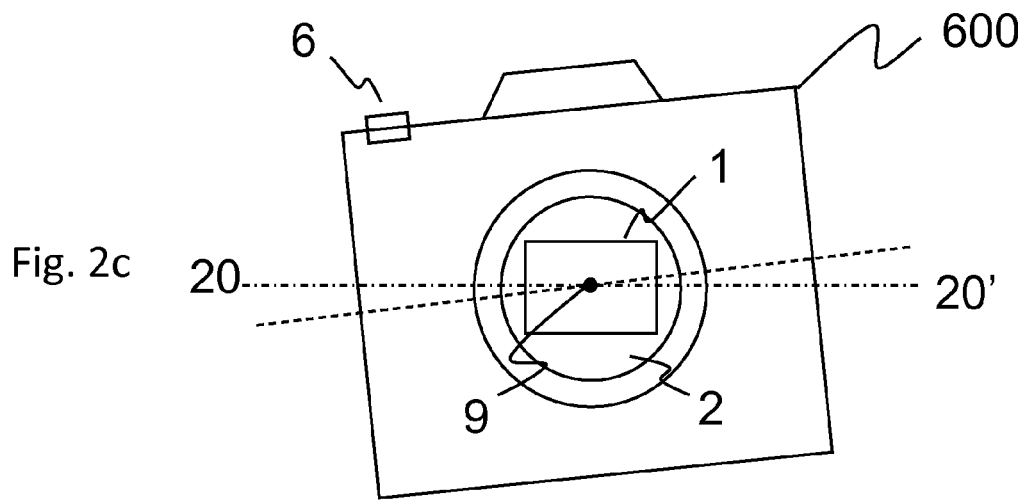

The corrective intervention carried out by the motor device 64 will lead to the situation of FIG. 2c: in the absence of any movements imparted from the outside, the capturing apparatus 600 has remained substantially inclined as shown in FIG. 2b, while the optical sensor device 1 has turned by an angle −a having the same absolute value as, and the opposite sign of, the one of FIG. 2b, thus having its horizontal axis of symmetry substantially parallel to the predetermined reference axis desired by the user, with which it forms an angle having a null or negligible value. Through the effect of this compensating rotation, the image captured by the optical sensor device 1 will become the one shown in FIG. 3a, corresponding to the one that would be obtained in the capture situation shown in FIG. 2a, wherein the optical sensor device 1 is rigidly constrained to the apparatus 600 and is aligned with it and with the predetermined horizontal reference axis. When the motor device has rotated the optical sensor device 1 by the angle −a, the unit 62 will carry out the actual capture of the image, provided that the other capture setup operations, already mentioned, have been completed, which may advantageously be carried out simultaneously with this one.

The motor device 64 may be implemented, for example, by means of a servomotor capable of taking any predetermined angular position through suitable control signals sent to its inputs. This type of device is generally fitted with a mechanism that detects the offset of the angular position with respect to the position that one wants to impose. This offset may constitute the error signal which is appropriately used as a control signal in order to reach the desired angular position; when said position is reached, the error signal is cancelled, thus stopping the rotary motion given to the rotary part of the motor device 64. Said rotary part may conveniently be mechanically coupled to the optical sensor device 1 to obtain the operation described in the present invention.

Since these setup operations take a non-negligible time, typically a few tenths of a second, it may happen that the user accidentally moves the capturing apparatus 600, and that such a movement includes a rotation of the optical sensor device 1 with respect to the direction of propagation of the luminous rays 9. It is therefore advantageous that the processing and control unit 62 constantly monitors, with appropriate frequency, the inclination of the sensor device 1 through the inclination sensor 60, so as to be able to correct any undesired rotations occurring during the image capture setup step.

FIGS. 4 and 5 describe the operation of the capturing apparatus 600 in the case wherein images are captured with the optical sensor device 1 oriented in the so-called "portrait" position, i.e. with the shorter sides at the top and bottom of the image; conversely, in FIGS. 2 and 3 it is assumed that said sides are located on the right and on the left of the barycentre of the rectangle occupied by the device 1 (called "landscape" orientation). The operation of the present invention is similar to the one already described with reference to FIGS. 2 and 3.

Let us assume that the user issues the capture execution command by actuating the element 6 while the capturing apparatus has undergone a rotation by an angle b, which is now negative because it is directed in the opposite direction, undesirably imparted thereto (see FIG. 4b) with respect to the ideal capture situation shown in FIG. 4a, which would give an image captured on the sensor device 1 like the one shown in FIG. 5a, which the electronic control circuits of the device normally straighten up prior to storing it into the non-volatile memory, so as to obtain the resulting final photographic image shown in FIG. 5c. In this case, the framed scene, which includes a tree, a house and the horizon in the background, will appear with the objects aligned with, i.e. parallel to, the rectangular edges of the image. FIG. 5b1 shows the image captured by the optical sensor device 1 in the situation of FIG. 4b, whereas FIG. 5b2 illustrates the same image of FIG. 5b1, but rotated by 180° and then straightened up so as to make the edges of the image parallel to the edges of the page. In this case as well, as in the parallel case of FIGS. 3b1 and 3b2, there will be an unpleasant effect due to the unnatural inclination of the objects framed in the scene. Also in this case, therefore, the predetermined reference axis relative to which any inclination or angular offset of the device 1 will have to be detected and cancelled is the horizontal axis.

The governing unit 62, once it has acquired the image capture command, detects through the inclination sensor 60 the presence of a non-null inclination of the axis of symmetry 40-40' of the optical sensor device 1 with respect to the predetermined horizontal reference axis, and induces the motor device 64 to impose a rotation dependent upon the acquired inclination. In particular, this rotation may have the same absolute value as, and the opposite sign of, the one detected by the inclination sensor 60, i.e. a value −b, in the direction indicated by the curved arrows in FIG. 4b, thus making the minor sides of the optical sensor device 1 substantially parallel to the predetermined horizontal reference axis, as indicated in FIG. 4c, which shows the final position reached by the optical sensor device 1 at the end of the capture setup operation according to the present invention.

It must be pointed out that the main difference between FIGS. 2 and 3 and FIGS. 4 and 5 is that the axis of symmetry of the sensor device 1, the inclination of which is calculated with respect to the predetermined reference axis, which is still the horizontal one, is different: in the former case, said axis of symmetry runs parallel to the direction of the major sides, whereas in the latter case it runs parallel to the direction of the minor sides.

Two-axis inclinometers are already available which can sense the inclination relative to two axes perpendicular to each other; it is therefore possible to use the same inclination sensor, appropriately controlled, for both capture orientations, i.e. landscape and portrait. Should this not be possible for any reason, it would be possible to employ an orientation detector 68 capable of establishing whether the sensor device 1 is oriented horizontally (landscape) or vertically (portrait), and have the detector 68 detect said orientation. Detectors of this kind are already available on the market and are being utilized in some capturing apparatuses. The governing unit 62 acquires the orientation information from said detector and activates the detection of the desired inclination by the correct single-axis inclination sensor 60 among those present in the capturing apparatus 600, which may contain two inclination sensors, each capable of sensing the inclination of the optical sensor device 1 in one of the two principal cases of horizontal and vertical orientation.

At the end of the actual capturing step, the governing unit 62 may advantageously cause the optical sensor device 1 to return to its idle position, where it was prior to the image capture setup step, by acting upon the motor device 64 and possibly by commanding the micro-mechanical actuator device 69, if present, to make again the optical sensor device 1 rigidly constrained to the body of the capturing apparatus 600.

In this manner, the optical sensor device 1 will be positioned relative to the capturing apparatus 600 as illustrated in FIGS. 2a and 4a, i.e. with at least one pair of opposite sides substantially parallel to at least a portion of a side surface of the capturing apparatus 600. This position is the one in which a skilled user will most likely do the shooting, and is also the starting position for any undesired angular movements of the capturing apparatus 1, which may be positive or negative with the same probability, but are generally very small, typically of the order of a few tenths of a degree to a few sexagesimal degrees. Furthermore, in this position the image shown on the optical viewfinder 3 or on an LCD for displaying the framed scene will coincide with what can be captured by the optical sensor device if the capture process is activated without any undesired inclination, thus ensuring the utmost correspondence between what is being displayed and what can be captured by the apparatus 600.

This homing may also occur after a predetermined time interval has elapsed since the last capture attempt. In fact, especially when freely capturing single images, the user tends to take a series of shots in quick succession, one after the other. In such a case, it is better to wait a few instants before homing the sensor device because, in the event that a new capture step is started soon after the previous one, the sensor device will probably have an inclination close to that of the last capture made. Therefore, the corrective rotation that must be imposed in order to compensate for the undesired inclination would be smaller than necessary for first homing the optical sensor device 1 and then imposing thereon the compensating rotation required for the next capture. In general, this brings about considerable savings in terms of dissipated energy and time necessary for the motor device 64 to carry out the corrective rotary movements when close shots are taken.

The invention therefore relates to an image capturing apparatus according to claim 1.

Further non-obvious embodiments of the invention are specified in dependent claims.

Variants and Generalizations

In the above description it has been assumed that the image arrives upside-down at the optical sensor device 1. Should it be possible for the image to arrive at the device 1 already straightened up, it will be apparent to those skilled in the art what modifications will have to be made to the innovative image capturing apparatus described herein in order to implement the present invention.

The present invention is applicable without distinction to both cases wherein single images are captured and wherein sequences of images are captured in the form of a video. The difference is simply that in the latter case the capture process will take place continuously by repeating, at a predetermined interval (typically 25 or 30 frames per second) the capture of a single image, so as to form a video stream showing continuous progress over time, which gives the viewer the perception of objects moving in the framed scene, as it happens in live human vision. The only difference, which is wholly inessential for the purposes of the present invention, is that in the latter case it is sufficient that the processing and control unit 62 operates a continuous control mechanism: it can monitor with a predetermined frequency the inclination taken by the sensor device when capturing the single images composing the video sequence, and then accordingly compensate for any individual inclinations detected with respect to the predetermined reference axis by means of the motor device 64, which will impose on the optical sensor device 1 a rotation equal and contrary to that corresponding to the detected inclination.

The description refers to the commonest case wherein the predetermined reference axis is the horizontal one, which coincides on the earth surface with the one perpendicular to the vertical of the place where the user of the image capturing apparatus is located. This represents no limitation whatsoever to the scope of the present invention. In fact, it is conceivable that the user can predetermine or re-determine any reference axis relative to which the inclination of the optical sensor device must be calculated and cancelled during the image capturing step. This is particularly useful when special visual effects are to be obtained, such as, for example, a photograph with rhomboidal edges, wherein the framed subjects must have a predetermined inclination with respect to the image edges, or when the user wants that the contour of a particular object in the image, which is not aligned with the others, is at least aligned with the edge of image, e.g. the Tower of Pisa. In substance, the user can be given the possibility of managing the alignment of the captured image during the very capturing step.

It is also advantageous that the direction of the predetermined reference axis, whichever it is, can be displayed on the frame display 67 of the apparatus 600. With reference to FIG. 7, let us assume that the user has specified the vertical axis as a predetermined reference axis. In this case, for example, the user may be allowed to activate, through an interactive menu, the visualization of said reference axis on the frame display by means of a graphic element 74 consisting of one or more straight elements superimposed on the framed image (e.g. dashed segments, segment grid, and the like), which indicate to the user the position of said reference axis, relative to which the optical sensor device 1 will be aligned in accordance with the mechanism of the present invention.

The user can activate this superimposition as necessary, and possibly change its position on the frame display 67 through suitable input elements, so as to be able to verify the alignment of the subject relative to which the edges of the captured image are to be aligned. In this particular embodiment of the present invention, it is therefore necessary that the processing and control unit 62 causes the graphic element 74 to be displayed in alignment with the predetermined reference axis that is currently active, on the basis of the direction of said axis acquired by a suitable inclination sensor. For simplicity, this sensor is not shown in the block diagram of FIG. 6. It may be any known device already used for this very purpose in many fields, e.g. for navigation dashboards in the aircraft industry. In the particular case considered herein by way of example, said reference axis corresponds to the vertical axis that connects the shooting location with the earth centre; it follows that one may use a miniaturized gyroscope capable of aligning itself with said vertical axis.

In the particular case of FIG. 7 it is assumed that the graphic element 74 consists of one horizontal dashed segment and one vertical dashed segment always indicating the direction of the vertical axis and of the horizontal axis, relative to which the edges of the captured image must be aligned. With reference to FIG. 7, it is assumed that the user wants to align the captured image based on the house in the left-hand part of the framed scene, which house is for some reason misaligned with respect to the remaining framed objects. He/she then tilts the capturing apparatus in a manner such that the frame edges are aligned with said object, as shown in FIG. 7b, and moves the components of the superimposed graphic element 74, through suitable keys or other input means, in a manner such that said graphic element overlaps some contour lines of the object, as shown in FIG. 7b for the horizontal dashed segment and in FIG. 7c for the vertical dashed segment as well. In point of fact, one dashed segment would be sufficient, whose direction is parallel or orthogonal to the predetermined reference axis; however, preference has been given, as a more comfortable solution, to two dashed segments orthogonal to and movable independently of each other. This makes it unnecessary to modify the framed area to position the components of the element 74 over the contour lines of the object of interest that must be aligned. Actually, in order to ensure that the captured image is as desired by the user, it is sufficient that even just one of the dashed segments is simply parallel to one of the contour lines to be aligned with the edges, and the user may start the actual capture as soon as these more generic conditions take place, without first moving the segments of the graphic element 74 precisely over said contour lines. Superimposition is only useful for offering more certainty to those users who cannot appreciate with sufficient precision on the display 67 the parallelism between segments and contour lines.

Figure 7A:
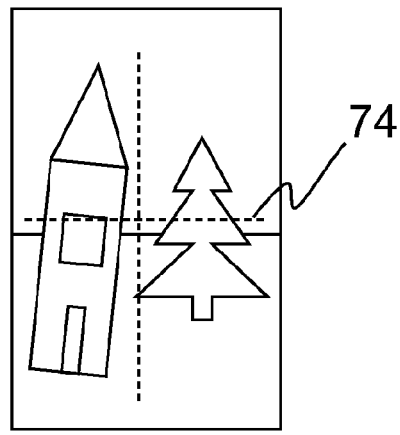
FIGS. 7 and 8 show other images that can be captured with two particular implementation variants of the invention.
Figure 7B:
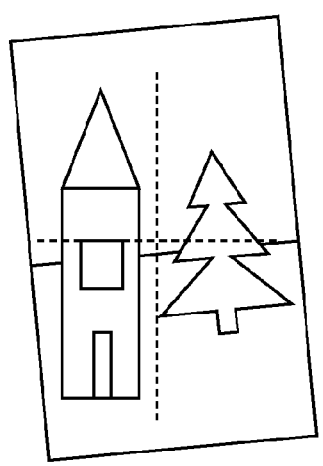
Figure 7C:
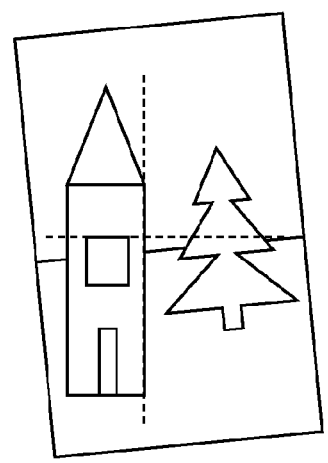
Figure 7D:
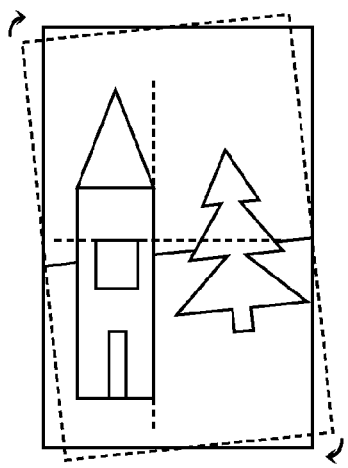
Figure 7E:
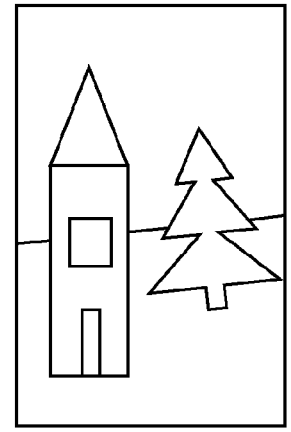
Figure 8A:
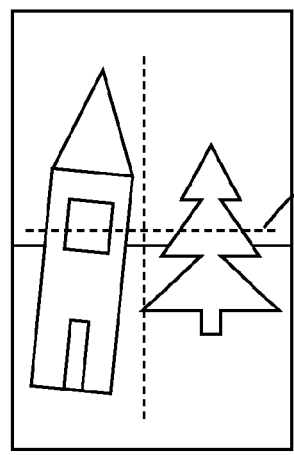
Figure 8B:
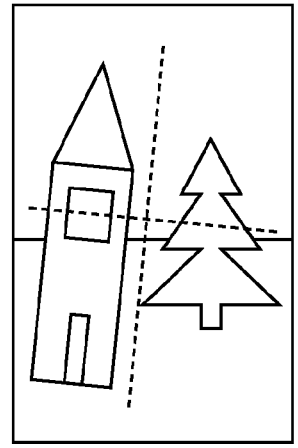
Figure 8C:
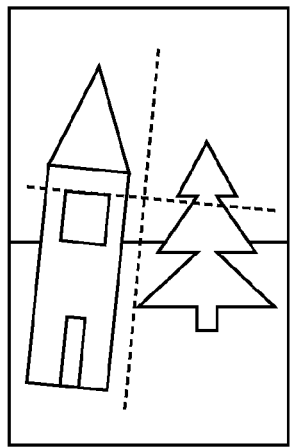
Figure 8D:
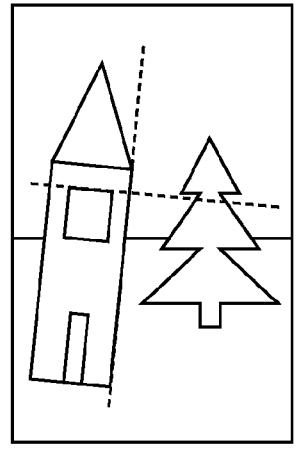
Figure 8E:
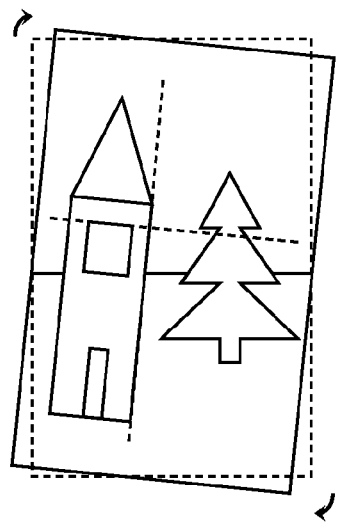
Figure 8F:
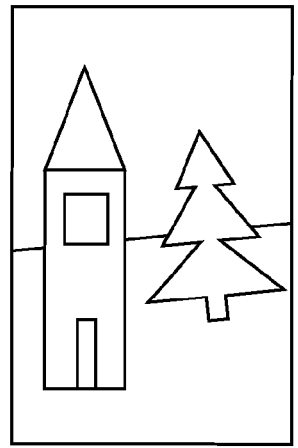

At this point, after having verified in any one of the above-described manners that the object of interest is displayed on the display 67 aligned with the element 74, the user actuates the capture start element 6 and the governing unit 62 applies the mechanism for aligning the optical sensor device 1 with respect to the predetermined reference axis resulting from the user's selection, as previously described, by calculating the rotation to be imparted to the capturing device 1 in order to obtain an effect which is equivalent to the rotation shown in FIG. 7d, taking into account the possible overturning undergone by the image when it hits the capturing device 1, which overturning has been intentionally ignored in FIG. 7 for simplicity. The captured image thus obtained is shown in FIG. 7e, wherein the governing unit 62 has caused the rotation imparted to the optical sensor device 1 to be such that the captured image coincides with the one desired by the user, i.e. with the contours of the house, as specified during the capture setup step, parallel to the edges of the image.

This variant offers the advantage that it is very comfortable and practical for the user, who needs not carry out any movements of the dashed segments relative to the framed subjects. On the other hand, it requires the presence of an additional inclination sensor to indicate the direction of the predetermined reference axis to the governing unit 62 that controls the visualization on the display 67. It is however possible that said sensor is already implicitly present in the apparatus 600 as a component of the inclination sensor 60, e.g. in the presence of a gyroscope whose operation is based on the force of gravity, when the predetermined reference axis coincides with the direction of said force. This possible additional sensor must be powered and activated at least for the whole duration of the selection of the alignment contour lines as previously described.

A further implementation variant will now be illustrated with reference to FIG. 8. In this case as well, the user can activate the superimposition of a graphic element 74 indicating the direction of alignment, i.e. of the predetermined reference axis relative to which the image must be captured by the capturing device 1. In fact, upon input by the user, the governing unit 62 commands the visualization of the graphic element, which is initially oriented along a predefined axis known to said unit. In this case, however, the user can rotate the graphic element 74 by operating suitable input means (keys, wheels, knobs, touch-screen areas, etc.) until at least one of its segments becomes parallel to the contour lines of the subject of interest, which is assumed to be, as in the previous case, the leaning house in the scene that is being framed in FIG. 8, which is for some reason still misaligned with respect to the remaining scenery. In the particular case of FIG. 8c, it is assumed that the user has moved the shorter dashed segment over an edge of the window, while in FIG. 8d he/she has also moved the longer dashed segment over an external wall of the house.

At this point, the user has made sure that the dashed segments are aligned with the contour lines of the desired subject, and can therefore actuate the capture start element 6. The processing and control unit 62 acquires the predetermined reference axis based on the commands issued by the user and on the knowledge of the initial orientation thereof, and implements the mechanism for compensating for the inclination of the image edge relative to said predetermined reference axis defined by the graphic element 74 as previously described. Said unit 62 acts upon the capturing device 1 through the motor device 64 to achieve an effect equivalent to the rotation shown in FIG. 8e, so as to obtain the captured image 8f, which has the alignment specified by the user by rototranslating the components of the graphic element 74. Also in this case, the possible overturning of the image on the optical sensor device 1 has been intentionally disregarded. The governing unit 62 knows if said overturning has occurred, and can implement the capturing device alignment mechanism in a manner such that the resulting image is the one specified regardless of said overturning, as already described.

It should be noted that in this case the user has rotated the graphic element instead of the capturing apparatus (and hence its optical sensor device 1, which at this stage is supposed to be rigidly constrained to the body of the apparatus) as in the preceding case; also, unlike the preceding case, no additional sensor is now required. The main drawback is that the graphic element 74 must be rotated on the display, which operation might not be easily executed by an unskilled user.

In one implementation variant, the inclination sensor may be built in the motor device 64 itself. In fact, devices exist which are suitable for use in the apparatus 600 and which include an encoder, i.e. an element capable of detecting the angular position of the axis of rotation of the motor device 64, to which the optical sensor device 1 is rigidly constrained, at least during a part of the image capture setup step. In such a case, with appropriate measures the motor device 64 can be made capable of providing, at least partially, the functions that in the present invention are carried out by the inclination sensor 60. As a further step towards integration, the processing and control unit 62 that partly or totally supervises the sensor device alignment mechanism described herein may be provided as a single electromechanic integrated circuit block capable of ensuring all interactions with the inclinometer 60 and with the motor device 64, so as to implement the above-described alignment mechanism under the control of a microprocessor or computing unit of a higher hierarchical level, which governs the operation of the components of the apparatus 600.

In particular cases, a user may not want the alignment function of the present invention to be turned on automatically when using the apparatus 600. It is therefore advantageous to allow the user to somehow deactivate the present invention at will, e.g. through an item of the interactive control menu which is normally used in order to set the operating modes of the apparatus. In addition or as an alternative, it is conceivable to provide a special quick on/off key for activating or deactivating the automatic realignment function and the captured image inclination management function according to the present invention. This is especially advantageous for those types of apparatus wherein it is very important for the user to benefit from the possibility of automatically eliminating any misalignment or of manually controlling the alignment of the image edges with respect to the framed objects.

In most cases, the predetermined reference axis coincides with the direction of the force of gravity; therefore, it is possible to use a device that exploits the presence of the force of gravity, such as, for example, an inclinometer making use of gyroscopic effects.

The predetermined reference axis may be established when manufacturing the image capturing apparatus 600, and said factory setting may be stored as an active default setting, unless the user re-defines it by changing direction in accordance with one of the methods described above.

When using a servomotor as a motor device 64, there is the advantage that it can be used in order to hold the sensor device 1 in relation to the machine body 1, the sensor device being supposed to be mechanically coupled to the motor shaft. There is however the drawback that it keeps absorbing energy as long as the capturing device 1 must stay integrally anchored to the body of the apparatus and move coherently therewith. Since such time may be as long as most of the operating time of the apparatus 600, it is advantageous that the governing unit 62 automatically activates the mechanical actuation device 69 to make the optical sensor device 1 rigidly constrained to the body of the apparatus 600 after a predetermined time interval of inactivity of the apparatus, i.e. when a time longer than a predetermined threshold has elapsed since the last image capture attempt or, alternatively, since the last actuation of any input element by the user and/or since the last movement of the apparatus 600 detected by any motion detector means (e.g. accelerometers).

Of course, the governing unit 62 may induce the same mechanical actuation device 69 to release the optical sensor device 1 from the machine body as soon as it detects that it is appropriate to prearrange said optical sensor device 1 for making a compensation or alignment rotation, e.g. when the user actuates some predetermined input elements or when movement of the apparatus 600 is detected after a certain period of stillness, and so forth. The same can be done for deactivating or activating, respectively, the automatic alignment function or the inclination management function in the case of presence of a specific option in the interactive control menu of the apparatus 600 or a specific quick on/off key of the type already described.

The present invention is applicable to any optical sensor device capable of converting luminous rays incident thereon into a form that can be stored into any type of physical medium, whether said medium is external or internal to the optical sensor device itself and whether it is a semiconductor memory or an optical or chemical medium. It is therefore also applicable to optical sensor devices with CCD or CMOS sensors and to traditional photographic films capable of storing incident luminous rays by exploiting electrochemical transformations of particular substances present on their surface. It is sufficient that the housing that contains the medium portion concerned by irradiation for capturing the image is coupled to the machine body and is rotatable as described for the present invention, which is nonetheless preferably applied to present and future electronic optical sensors, which are better suited to using the present invention, wherein it is advantageous to benefit from a small physical medium for converting incident luminous rays that can be housed in a confined region of the apparatus 600. The same is true for any optical sensors created with non-electronic technologies.

Some preferred embodiments of the present invention have been illustrated and described herein; of course, it will be immediately apparent to those skilled in the art that the present invention may be subject to many variations and modifications functionally equivalent to those described herein, which will still fall within the protection scope of the invention as set out in the appended claims, which are intended to be an integral part of the present description.

The invention claimed is:

1. An apparatus for capturing one or more images, comprising:
   a body that can be freely tilted relative to a predetermined reference axis through the effect of a rotation about a certain axis of rotation, said axis of rotation being fixed with respect to the apparatus;
   an optical sensor device capable of capturing luminous radiation incident thereon and of converting the luminous radiation so that the luminous radiation can be stored into a physical medium in the form of a captured image, wherein said optical sensor device is mechanically coupled to the body of said apparatus in a manner such that the optical sensor device can be controllably rotating about said axis of rotation;
   an inclination sensor adapted to detect an angular offset of said optical sensor device with respect to said predetermined reference axis;
   a motor adapted to rotate said optical sensor device about said axis of rotation when the optical sensor device it is made capable of being controllably rotated about said axis of rotation by said motor;
   processing and control unit associated with said inclination sensor and with said motor and adapted to change the inclination of said optical sensor device through said motor depending on the angular offset detected by said inclination sensor with respect to said predetermined reference axis; and
   a mechanical coupler associated with the processing and control unit, wherein the mechanical coupler is adapted, under control of said processing and control unit, to:
   mechanically couple the optical sensor device to the body of the capturing apparatus rigidly and decouple the optical sensor device from the motor when said change of inclination is not performed, or
   rotatably couple the optical sensor device to the motor and decouple the optical sensor device from the body when said change of inclination is performed.

2. An apparatus according to claim 1, wherein said processing and control unit is adapted to determine a variation in the inclination of said optical sensor device so as to substantially cancel said angular offset detected by said inclination sensor with respect to said predetermined reference axis.

3. An apparatus according to claim 1, wherein:
   said processing and control unit cause said variation in the inclination of said optical sensor device following the actuation of an actuator element which starts the image capture by the optical sensor device;
   the optical sensor device is mechanically and rigidly coupled to said body of the apparatus prior to said actuation, and can rotate relative to said axis of rotation following said actuation;
   the image is only captured when said optical sensor device has reached the inclination variation caused by said processing and control unit.

4. An apparatus according to claim 1, wherein said processing and control unit is adapted to control the optical sensor device in a manner such that, at the end of said change of inclination, the optical sensor device resumes the inclination it had relative to said predetermined reference axis prior to said change of inclination.

5. An apparatus according to claim 1, wherein said processing and control unit is adapted to control said mechanical coupler in a manner such that the optical sensor device is rigidly coupled to the body of the apparatus at the end of said change of inclination.

6. An apparatus according to claim 1, wherein said processing and control unit is adapted to control the motor in a manner such that, at the end of said change of inclination, the optical sensor device resumes the inclination it had prior to said inclination variation step.

7. An apparatus according to claim 6, wherein said inclination that the optical sensor device had prior to said change of inclination corresponds to the direction of said predetermined reference axis.

8. An apparatus according to claim 1, wherein the optical sensor device has a substantially rectangular cross-section relative to said axis of rotation, and at least a portion of at least one of the edges of the cross-section relative to said axis of rotation of the outer casing of said capturing apparatus is substantially parallel to at least one side of said substantially rectangular cross-section of said optical sensor device when said change of the inclination of said optical sensor device is not being carried out.

9. An apparatus according to claim 1, wherein said axis of rotation coincides with the axis of incidence of said luminous radiation on said optical sensor device, and said optical sensor device is positioned substantially perpendicular to said axis of rotation.

10. An apparatus according to claim 1, wherein the predetermined reference axis has at least one of the following characteristics:

a) the predetermined reference axis is predetermined when manufacturing the apparatus;
b) the predetermined reference axis can be defined or re-defined by the user of the apparatus;
c) the predetermined reference axis corresponds to the direction of the conjunction line joining the centre of gravity of the optical sensor device with the centre of the earth;
d) the predetermined reference axis corresponds to the direction perpendicular to that defined in c).

11. An apparatus according to claim 1, wherein an additional sensor is provided for detecting the direction of the predetermined reference axis, and wherein said processing and control unit monitor the direction detected by said additional sensor, with which they are associated at least during said change of the inclination of the optical sensor device.

12. An apparatus according to claim 1, wherein the processing and control unit causes a graphic element, which indicates the direction of said predetermined reference axis, to be displayed on a display device adapted to display, at least partially, the image that can be captured by the optical sensor device.

13. An apparatus according to claim 12, wherein said graphic element can be re-positioned by the user through rotation and/or translation operations by actuating suitable input elements provided on the apparatus.

14. An apparatus according to claim 12, wherein the predetermined reference axis can be defined or re-defined by the user of the apparatus by rotating the graphic element displayed on the display device.

15. An apparatus according to claim 1, wherein said detection of the angular offset of the body of the apparatus and said imposition of a variation in the inclination of said optical sensor device by the processing and control unit occur continuously at regular intervals following the acquisition of a suitable command for capturing a video image sequence.

16. An apparatus according to claim 1, wherein said imposition of a variation in the inclination of the optical sensor device effected by the processing and control unit is deactivated through said motor.

17. An apparatus according to claim 1, wherein a rotation axis of said motor is directly coupled to said optical sensor device.

* * * * *